United States Patent Office 3,467,177
Patented Sept. 16, 1969

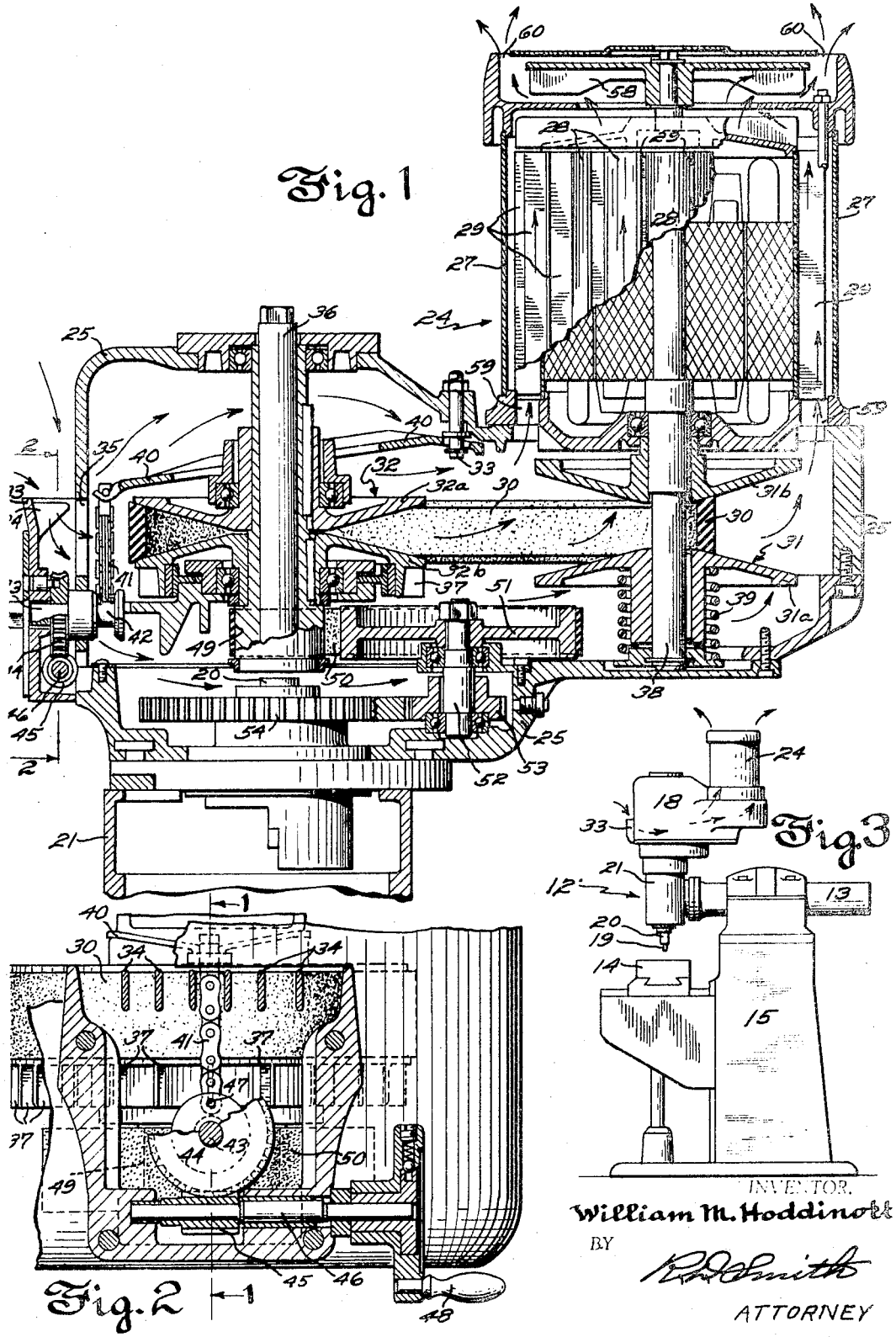

3,467,177
AIR COOLING SYSTEM FOR HEAT GENERATING POWER TRANSMISSION AND MOTOR UNIT
William M. Hoddinott, Milford, Conn., assignor to Textron Inc., Providence, R.I., a corporation of Delaware
Filed Oct. 5, 1967, Ser. No. 673,182
Int. Cl. F24h *3/00;* F28f *13/12, 7/00*
U.S. Cl. 165—47
9 Claims

ABSTRACT OF THE DISCLOSURE

A portable self-powered, self-cooled, tool driving appliance detachably and adjustably mounted on a milling machine standard to function as a machine tool, and comprising the unitary combination of a shell encompassed, heat generating electric power motor and a housing enclosed, heat generating, set of pulleys, gears, or the like, that transmit power from said motor to said tool at steplessly variable speeds. The interiors of said housing and shell communicate in a way to form a continuous channel for the flow of cooling air serially through said housing and then the shell from an air inlet port, located at a point in said housing remote from the motor, to a discharge vent in said shell located at a point remote from said housing, there being in one or both said housing and shell air impelling means operative to force and maintain said flow of air, whereby relatively cool ambient air is first drawn into said housing, picks up relatively low heat generated by the transmission mechanism, carries the low heat onward into and through the more intensely heated interior of said shell and lastly discharges the doubly heated air flow through said vent.

BRIEF DESCRIPTION OF THE INVENTION

In portable electric appliance units that include an electric motor operating to drive a tool through the medium of speed reduction mechanism, it has been customary to cool the electric motor by a flow of air that serves rather ineffectively to exert a slight cooling effect also upon the transmission mechanism. Such ineffectiveness of cooling has been tolerable in lower powered appliances having simple speed reduction mechanism as in the self-powered milling attachment for a machine tool shown in U.S. Patent No. 2,275,291, where permissible temperatures may run to 160 degrees Fahrenheit or more. But in the more modern constructions of stepless speed varying, transmission mechanisms a higher heat is generated by the running parts of the mechanism and nevertheless the parts, because of modern practice in using plastics or other nonmetallic materials as a substitute for metallic splines and bearing bushings as proposed in U.S. Patents Nos. 3,122,384 and 3,138,032, need greater protection against overheating. Approximately 86 degrees Fahrenheit is regarded to be a very desirable temperature at which such mechanisms can be run at practical speeds.

Another drawback of self powered milling heads such as shown in the aforesaid Patent No. 2,275,291 is that the cooling air, previously admitted at the top of the motor, is discharged through a lateral aperture in the transmission housing close to the head of the machine operator so that the turbulence, noise and heat borne by the thus discharged cooling air is a serious disturbance in controlling the machine.

Hence it is an object of the present improvements to remedy the above disadvantages in the type of appliance concerned. The importance of keeping the housing structure, as well as its contents, at minimum temperature is to avoid distortion of framework linking the machining unit to the work that is to be machined, this being a common cause of dimensional instability in milling machine operation.

A further object is to cool the power transmitting, or speed reduction, mechanism more effectively than has been possible by cooling systems heretofore employed.

A specific object is to reduce and maintain the temperature of transmission belts and other nonmetallic parts at as much below 170 degrees Fahrenheit as possible particularly in variable speed transmissions of the stepless type because belt life becomes extremely short at 170 degrees.

Another object is to avoid heating the flow of cooling air before it is brought into heat exchange contact with the variable speed mechanism for better cooling effect upon the latter.

Another object is to avoid discharging a flow of heated air near positions that need be occupied by the head of the operator in running the machine tool.

These and other objects of the invention will appear from the following description of a preferred embodiment of the invention having reference to the appended drawings wherein:

FIG. 1 shows an embodiment of the improved cooling system and is a view partially in section on the vertical plane central of the machining attachment identified as 1—1 in FIG. 3.

FIG. 2 is a fragmentary view on the vertical plane 2—2 in FIG. 1 looking in the direction of the arrows.

FIG. 3 illustrates a typical use for the unit of FIG. 1 detachably and adjustably mounted on the overarm of a milling machine.

An illustrative embodiment and use of the present invention is represented in the drawing wherein, with particular reference to FIG. 3, a milling machine 12 of the general type disclosed in U.S. Patent No. 2,275,291 is shown in outline including an overarm 13 supported on a standard 15 equipped with an adjustable work feeding table 14.

Detachably mounted for adjustive settings on overarm 13 there is a self powered, portable appliance 18 operative as a work machining unit and incorporating the present improvements. The appliance includes a suitable machining tool 19 such as a drill, milling cutter, grinding wheel, broach, or the like, held and driven by a vertical spindle 20 that depends from its quill housing 21. Such unit is appropriately referred to as an appliance or attachment in that it can be removed from the overarm and transferred to other locations on the overarm or to other machine tools having a suitable rest or table for feeding the work that is to be machined.

In appliances of this kind power is usually derived from an electric motor 24 mounted on a housing 25 from which quill housing 21 fixedly depends and that encases speed reducing, power transmitting mechanism 26, including a belt 30 trained about a drive pulley 31 of the expansible V-groove type and a driven pulley 32, having a V-groove of selectively variable width.

Drive belt 30, pulleys 31, 32 and other parts of the transmission gear are shown in FIG. 1 to occupy a transmission chamber defined by housing 25. An inlet to housing 25 for cool ambient air is provided by a detachable louver 33 affording an intake port for cooling air and protecting against the accidental insertion of foreign objects by means of a row of spaced apart cantilever fins 34. Louver 33 covers a sizeable opening 35 in the front wall of housing 25 except for the air admitting spaces between fins 34.

The speed ratio of driving parts to driven parts is variable on the stepless shift principle by making pulleys 31 and 32 of the variable groove type. The bottom part 31a of drive pulley 31 is keyed slidably to the motor shaft 38 and is constantly thrust toward pulley part 31b by an axially tensioned spring 39 whereby to drive the belt 30 by squeezing it in the variable width of V-groove that results. Both spreadable parts 32a and 32b of pulley 32 are keyed to the shaft 36 which carries a cylindrical pulley surface 49 for a flat driven belt 50.

The part 32a of pulley 32 is positively forced downward along its shaft 36 to selective spacings from pulley part 32b by a shift lever 40. This positively varies and determines the width of the V-groove in pulley 32. Pulley part 32b is provided with fan vanes 37 to assist in maintaining a flow of the cooling air. Shift lever 40 is pivotally anchored on housing 25 at 23 and is swung in groove closing direction by means of a chain 41 depending from its left end and anchored to a crank pin 47 on drum 42 which is fixed on a stub shaft 43 journaled in the wall of housing 25 and in the wall of louver 33. Thus the chain 41 is wound about such drum when the crank pin 47 is manually revolved to vary the speed of power transmission. Also fixed on shaft 43 is a worm gear 44 turnable in either direction by a worm 45 whose shaft 46 is journaled in the side walls of louver 33. As best shown in FIG. 2 worm 45 serves to lock worm gear 44 against turning, in any position to which it is set. Worm 45 is turnable in either direction at will by means of the crank handle 48.

Belt 50, driven by pulley surface 49, drives a pulley 51 fixed on a stub shaft 52 together with a spur pinion 53 which is in mesh with a gear 54. Stub shaft 52 is journaled in the bottom wall of housing 25 whereby gears 53 and 54 act as "back gears" reducing the speed derived from shaft 36 as they transmit the drive of said shaft to the separately turnable tool spindle 20 of the machine.

The stator 28 of motor 24 is equipped with axially extending radially projecting fins 29 between and along which air is sucked upwardly in heat exchange relation thereto by the blades of a fan 58 fixed on the motor shaft 38. The resulting flow of air is aided by the vanes 37 on pulley part 32b.

The course of air flow is serially from louver 33 in the direction of the arrows first through the full length of transmission chamber in housing 25 and then through communicating passageways 59 to the fin occupied spaces between the motor stator 28 and the motor casing 27 and then upward through casing 27 and outward through vents 60 at the top of the motor.

By means of the mechanism and enclosing structure now described an improved air cooling system is produced which keeps the temperature of the running parts of the transmission mechanism as low as 70 degrees Fahrenheit, or not substantially higher than that of the ambient air drawn into louver 33. This results in part from not heating the cooling air prior to its reaching the transmission mechanism and from directing the unwarmed air into thorough heat exchange contact with all of the mechanism in housing 25.

To emphasize the wide departure of low temperature results attained by the present improvements in contrast to harmful high temperatures characterizing previous and otherwise similar motor and transmission units, an example of actual contrasting temperature measurements is as follows.

In previous cooling systems such as represented by the milling head shown in the aforesaid Patent No. 2,275,291, the transmission housing by Fahrenheit measure ranged from 130 to 135 degrees. The ambient air drawn first into the motor at 72 degrees was discharged from the motor into the transmission housing at 125 degrees keeping the motor winding at about 107 degrees and keeping the transmission belt and pulleys as hot as 112 degrees. The cooling air was exhausted from lateral apertures in the transmission housing at as high as 130 degrees.

In contrast the improved cooling system disclosed herein draws ambient air first into the transmission housing at the same normal temperature of 72 degrees. This prevents the housing from rising above 86 degrees and the pulleys and belt from rising above 90 degrees. The heat exchange efficiency of the finned motor stator keeps the motor winding at about the same 90 degrees and the temperature of the cooling air exhausted from the motor shell into ambient air at about 84 degrees.

In both cases the above data is taken under maximum operating speeds with the motor subjected to a hundred percent overload. The recited difference in resulting temperatures is not an incidental matter of degree but alone makes possible the successful use in the transmission mechanism of plastic belts, splines and bearings impossible at the lowest temperatures that could heretofore be maintained.

What is claimed is:

1. In a heat generating self-cooled combined motor and power transmission unit the combination of, a heat generating power motor, air impelling means, a shell forming a chamber containing said motor, a heat generating power transmission mechanism, a housing forming a neighboring chamber containing said mechanism, a passageway providing communication between said chambers in a manner to complete a continuous channel operative to guide a flow of air serially from said housing to said shell, a port affording inlet to said housing for the intake of relatively cool ambient air at a point in said housing remote from said shell, and a vent giving outlet to said flow of air at a point in said shell remote from said housing, whereby said air impelling means in at least one of said chambers is operative to force said flow of air serially through substantially the entire lengths of both said chambers from said port to said vent.

2. The combination defined in claim 1, in which the said transmission mechanism includes two heat sensitive belts simultaneously running side by side within the said housing in the path of said flow of cooling air.

3. The combination defined in claim 1, in which the said air impelling means includes a fan near the said vent having vanes disposed to draw air serially through both of the said chambers and to discharge said air through said vent.

4. The combination defined in claim 3, in which the said transmission mechanism includes air impelling vanes within the said housing intermediate the said air inlet and the said motor operating in tandem with the said fan to displace air from the former toward the latter.

5. The combination defined in claim 3, in which the said transmission mechanism includes speed varying pulleys, one of said pulleys driving the said air impelling vanes.

6. The combination defined in claim 5, in which the said air impelling vanes are carried by the said air impelling pulley.

7. The combination defined in claim 1, together with a louver detachably mounted on the wall of the said housing forming the said port for the intake of air to said housing.

8. The combination defined in claim 7, in which the said transmission mechanism includes speed varying devices comprising a speed adjusting worm journaled in the said louver.

9. The combination defined in claim 8, in which the said channel for air flow contains the said louver and the said speed varying devices.

References Cited

UNITED STATES PATENTS

| | | | |
|---|---|---|---|
| 3,250,141 | 5/1966 | Luenberger | 74—230.17 |
| 3,353,591 | 11/1967 | Zak | 165—47 |

ROBERT A. O'LEARY, Primary Examiner

CHARLES SUKALO, Assistant Examiner

U.S. Cl. X.R.

74—230.17; 165—122, 138